Inventors
Edward C. Sintz &
George C. Trevarthen
By Willits, Helwig & Baillio
Attorneys United States Patent Office 2,702,219
Patented Feb. 15, 1955

2,702,219

LUBRICATING MECHANISM

Edward C. Sintz, Birmingham, and George C. Trevarthen, Detroit, Mich., assignors to General Motors Corporation, Detroit, Mich., a corporation of Delaware Application April 6, 1951, Serial No. 219,705

9 Claims. (Cl. 309—8)

The invention relates to improvements in means for lubricating bearing surfaces in a reciprocating device, such as a piston wrist pin bearing, and in which means the reciprocatory motion of a piston is effective to cause the lubricant to be delivered to the part to be lubricated.

It has been the practice in the past, when endeavoring to lubricate piston wrist pin bearings from oil deposited on a cylinder wall, to provide lubricant collecting means in a piston skirt with said means more or less sealed on all sides by the skirt and cylinder walls with the result that the oil available for lubricating said bearings was only that amount which managed to leak between the cylinder wall and the piston skirt into the collecting pockets. The present invention avoids such difficulty.

Heretofore non-forced-feed wrist pin lubricating devices have failed to provide sufficient lubricant to the wrist pin bearing surfaces under all operating conditions mainly due to the insufficient pressure of the lubricant delivered to the bearing surfaces.

The object of the invention is to provide a device which is simple, economical and reliable in operation for lubricating bearing surfaces not easily lubricated by a forced-feed lubrication system.

It is also an object of the invention to provide a device, as described, in which no parts or moving members need be added to those normally found necessary to the operation of a piston within a cylinder.

It is a further object to provide a wrist pin bearing lubricating device for more efficaciously collecting the lubricating liquid for delivery to the part to be lubricated.

It is an additional object to provide a device which delivers oil to the bearing surface at a higher pressure than that normally attendant in heretofore known types of inertia lubricators.

Certain other objects and advantages will appear from the drawings and the following description thereof.

While a specific embodiment of our invention is shown and described, it is not intended to limit ourselves to the precise form of construction which has, for convenience, been shown, inasmuch as structural alterations may be made within the scope of our invention.

Figure 1:
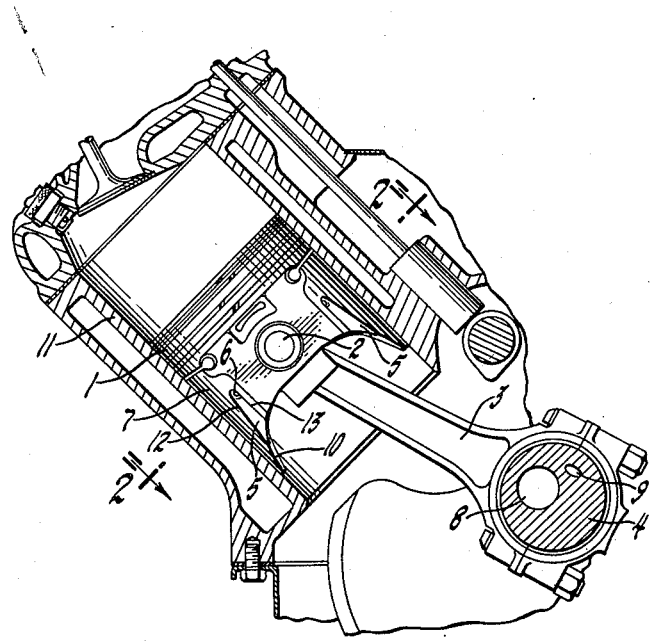
Figure 1 is a sectional view through the block of a V-shaped engine showing the general arrangement of parts and particularly the disposition of the novel lubricant collecting means.
Figure 2:
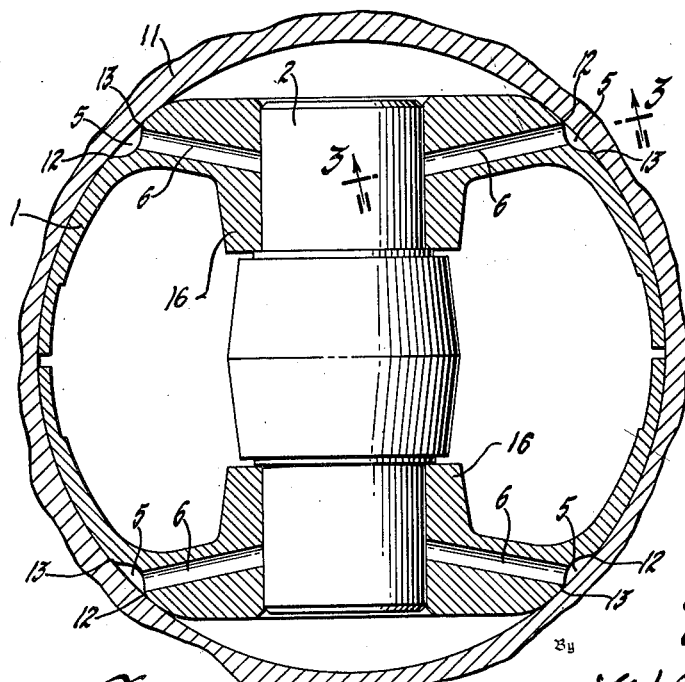
Figure 2 is a sectional view of the piston taken along the line 2—2 of Figure 1 showing the structural and spaced relation of the cylinder wall, collecting chamber, delivery passage and a bearing surface.

Referring by numerals to the drawings, 1 refers to a piston having a skirt 7, said piston being reciprocated within a cylinder 11 by a connecting rod 3 secured to the piston through a wrist pin 2 operating in wrist pin bearings 16 formed in spaced relation to one another in piston 1. The connecting rod is driven by a crankshaft 4. In order to provide proper lubrication for the wrist pin bearing surface, as shown in Figure 2, oil collecting channels or recesses 5 are formed in the skirt of piston 1. The channels may be either cast or machined into the skirt as desired. As shown in Figure 1, the lubricant collector 5 is a longitudinal channel or recess with an open end facing downwardly so as to scoop in the lubricant on the downstroke of the piston.

Figure 3:
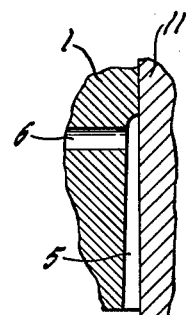
Figure 3 is a sectional view of the piston and cylinder wall taken along the line 3—3 of Figure 2 illustrating the chamber formed by the cylinder wall and the channeled piston skirt.

In the present invention, in order to insure an adequate supply of oil to the bearing surface, one end of the channel 5 extends to the bottom or inner edge of the piston skirt, as shown in Figures 1 and 3. By so constructing the piston skirt, the recess of channel 5 defines edges 12 and 13 which cooperate with the cylinder wall 11 to form a chamber sealed off from the rest of the piston and cylinder except at the bottom or inner edge thereof, as shown in Figures 2 and 3, whereby oil may freely and copiously flow into the collecting chamber. As further shown in Figure 3, the channel 5 tapers inwardly from the periphery of the skirt from top to bottom with the result that the chamber formed by the channel and wall 11 is wedge-shaped. The progressive reduction in cross-sectional area in the present lubricant collecting chamber has resulted in a substantial increase in the pressure of the lubricant delivered to the bearing surface and a concomitant decrease in wear thereof. By decreasing the depth of the collecting chamber toward its closed end, near passage 6, there is a tendency to squeeze the oil, thereby increasing the pressure with which it is delivered to the bearing surfaces. It has also been found that making the hcannels generally V-shaped, as shown in Figure 1, further restricts the cross-sectional area in the direction of the closed end of the channel, thereby adding to the pressure obtainable. By thus increasing the ability of the oil to reach all bearing surfaces, it is insured that the bearings will be sufficiently lubricated during their subjection to high wearing pressures as when operating at high speeds or loads.

Portions of the piston skirt 7 have been cut away below the wrist pin bearings, as seen in Figure 1. The margin 10 of said cut, which is part of the inner edge of the cylinder engaging surface of the piston 1, has been made to incline upwardly and outwardly in obliquely disposed relation to the axis of the piston 1 in order to further facilitate directing the flow of lubricant into the collecting chamber. Such an inclined or tapered scraping surface has in itself the effect of increasing the pressure of lubricant delivered to the bearing surface due to its tendency to force a greater volume of lubricant into the said chamber than would a corresponding non-tapered scraping edge.

To deliver lubricant from the collecting chamber 5 to the bearing surface in each of the wrist pin bearings 16 a passage 6 is provided in the piston. As shown in Figure 2, passage 6 leads from the closed end of chamber 5 to approximately the center of the wrist pin bearing surface. The axis of the passage 6 is substantially in the same plane as the axis of wrist pin 2.

A forced-feed lubrication system is provided for lubricating the connecting rod and crankshaft bearings. Such a system usually consists of a pump (not shown), a main oil passage 8 running throughout the length of the crankshaft and a series of arterial passages 9 which divert oil from passage 8 to the various bearing surfaces. The cylinder walls 11 are supplied with lubricating oil in any conventional manner. In the structure shown the oil which is supplied to the connecting rod bearings by the passages 9 will be thrown outwardly upon the inner surfaces of the engine which surround the crankshaft. Some of this oil will engage the inner surfaces of the cylinder 11 and the piston 1. The oil which is collected by the inner surfaces of the piston will flow inwardly to the inner edges of the piston and will be deposited upon the inner walls of the cylinder 11 to be thereafter scraped off and supplied to the wrist pin bearings by the obliquely disposed surfaces forming the skirts 7 and the channels 5. Oil also may be supplied to the inner surfaces of the cylinder 11 by ports formed in the connecting rods and communicating with the passages 9 as is disclosed in the Barr Patent 2,375,612.

The operating of the wrist pin lubricating system is readily apparent from the description of parts.

Although the lubricating system is shown in the setting of an internal combustion engine, it is not necessary nor intended to be limited thereto in its application.

We claim:

1. In a piston lubrication system of the type in which a wrist pin bearing is lubricated by action of the reciprocating motion of a piston to force lubricant scraped from a cylinder wall to the wrist pin bearings, a skirted piston having a segment of the lower portion of said skirt removed such that the bottom edge of said skirt is upwardly inclined along part of its length, a lubricant collecting channel formed in the peripheral surface of said skirt, one end of said channel opening into said inclined edge, the other end thereof communicating with the wrist pin bearing surface.

2. In a piston lubricating system of the type described in claim 1 in which the channel is tapered inwardly in said skirt from the outer periphery thereof, said taper being of minimum depth adjacent the upper end of said channel and of maximum depth adjacent the bottom edge of said skirt to form a chamber between said tapered wall and cylinder wall.

3. In a piston lubricating system of the type in which a wrist pin bearing is lubricated by the reciprocating motion of a piston effective to force lubricant scraped from the walls of a cylinder surface to the wrist pin bearings, a piston having a lubricant collecting channel formed in the skirt thereof, said channel being tapered inwardly in said skirt from the outer periphery thereof, said taper being of minimum depth adjacent the upper end of said channel and of maximum depth adjacent the bottom of said skirt wall to form a chamber between said tapered wall and cylinder wall having an open end at the bottom of said skirt and terminating at the top of said channel, and a passage connecting said chamber to said wrist pin bearing, said piston being effective on the downward stroke thereof to scrape lubricant from said cylinder wall into said chamber, the tapered wall of said chamber being effective to subject lubricant within said chamber to a substantial pressure rise as said lubricant passes from the bottom portion of said chamber to the upper portion thereof.

4. In an inertia lubrication system, a wrist pin bearing surface, a piston having a skirt wall, an inverted V-shaped channel formed in said skirt wall for collecting lubricant supplied to the cylinder wall, the divergent end of said channel opening into the bottom edge of the piston skirt and a passage connecting said channel to substantially the center of said wrist pin bearing surface.

5. In an inertia lubrication system as described in claim 4 in which the channel is tapered inwardly in said skirt from the outer periphery thereof, said taper being of minimum depth adjacent the upper end of said channel and of maximum depth adjacent the bottom edge of said skirt, thus forming a chamber between said tapered wall and cylinder wall.

6. In an engine having a cylinder, a piston therein, a cylindrical bearing surface in said piston, a lubricating means for said bearing comprising a lubricant collector formed in the skirt of the piston, said collector being a wedge-shaped chamber, a passage formed in the piston for connecting the wrist pin bearing surface with the lubricant collecting chamber, the longitudinal axes of said passage and said bearing surface being substantially coplanar, one end of said chamber opening downwardly into the bottom edge of the piston skirt, the other end of the chamber connecting with said passage.

7. In a piston lubricating system of the type in which a wrist pin bearing is lubricated by the reciprocating motion of a piston to force lubricant scraped from a cylinder wall into the wrist pin bearings, the skirted piston having a segment of the lower portion of said skirted piston removed such that the bottom edge of said skirt is upwardly inclined along part of its length, an inverted V-shaped lubricant collecting channel formed in the peripheral surface of said skirt, a passage connecting said channel with the wrist pin bearing surface, the divergent end of said channel opening downwardly into the inclined edge of said skirt, the other end thereof connecting with said passage, said channel being tapered inwardly in said skirt from the outer periphery thereof, said taper being a minimum depth adjacent the upper end of said channel and of maximum depth adjacent the bottom edge of said skirt to form a chamber between said tapered wall and cylinder wall.

8. A piston lubricating system which includes a piston having a wrist pin bearing, a cylinder surface engaging portion, an inner edge formed on the bottom of said surface engaging portion, a part of said inner edge being formed to extend obliquely around said cylinder engaging surface, a passage formed in the piston and extending from the wrist pin bearing to the obliquely extending part of said inner edge, whereby oil will be scraped from the cylinder by said inner edge and directed through said passage to said wrist pin bearing during piston reciprocation.

9. A piston lubricating system which includes a piston having a pair of wrist pin bearings, a cylinder surface engaging portion, an inner edge formed on the bottom of said surface engaging portion, portions of said inner edge being formed to extend obliquely around said cylinder engaging surface portion, a pair of passages extending from approximately the middle of each of said wrist pin bearings to the obliquely extending portions of said inner edge, the passages of each pair extending in substantially opposite directions relative to the respective bearing.

References Cited in the file of this patent

UNITED STATES PATENTS

| | | |
|---|---|---|
| 2,257,236 | Hayden | Sept. 30, 1941 |

FOREIGN PATENTS

| | | |
|---|---|---|
| 32,071 | Austria | Mar. 10, 1908 |